3,518,323
PURIFICATION OF BUTYLENES

Lloyd A. Pine, Durward T. Roberts, Jr., and Gordon B. Jolley, Baton Rouge, La., assignors to Esso Research and Engineering Company, a corporation of Delaware
No Drawing. Filed June 26, 1968, Ser. No. 740,096
Int. Cl. C07c 3/20, 11/02
U.S. Cl. 260—683.15                           11 Claims

ABSTRACT OF THE DISCLOSURE

This invention relates to a process for the separation of isobutylene from butylene mixtures. In particular, it relates to a process wherein isobutylene is removed from hydrocarbon mixtures, or feeds, containing isobutylene and n-butylenes. Such mixtures are contacted with supported nickel oxide catalysts at mild temperatures, ranging generally up to about 250° F. to substantially dimerize the isobutylenes, after which time the n-butylenes rich fraction can be readily separated from the resultant mixture, as by distillation. In a preferred combination, the so-purified n-butylenes rich fraction can then be contacted with propylene, at more stringent conditions in the presence of supported nickel oxide catalysts, to produce a codimerization reaction which forms highly linear $C_6$ through $C_8$ olefins, particularly heptenes.

---

It has heretofore been discovered that high purity n-butylene feeds can be codimerized with propylene, in the presence of supported nickel oxide catalysts at specified reaction conditions, to yield high concentrations of highly linear $C_6$, $C_7$ and $C_8$ olefins. By controlling reaction conditions, especially feed ratios, selectivities in the formation of heptenes from n-butylenes range from about 35 to about 45 weight percent. These heptenes are admirably suitable as feed stocks for oxonation to alcohols, the straight chain or lightly branched alcohols obtained being especially useful in the production of superior plasticizers.

Typically, commercially available butylene feed streams contain up to about 25 weight percent isobutylene, and higher, based on the weight of total butylenes. Unfortunately, in the nickel oxide catalyzed reaction between n-butylene and propylene, supra, the value of the product is downgraded. The isobutylene interreacts with itself. It reacts with propylene and n-butylenes to form dimers, trimers, tetramers, and heavier products. The diisobutylene obtained by reaction of the isobutylene is more branched than normal octene byproducts produced from n-butenes. Moreover, the boiling points of the diisobutylene and the heptenes are so close that it is difficult to separate the latter from the former by conventional distillation. The presence of the dissobutylene therefore lowers the value of the product stream. Furthermore, the isobutylene reacts quite readily; far more readily and more quickly than the n-butylenes, and therefore inhibits the normal rate of reaction of the n-butylenes. To obtain reasonable conversion of the n-butylenes it becomes necessary to use severe conditions, which further degrades the products of the reaction. In view of these and other difficulties, it is generally necessary or desirable to remove the isobutylene from butylene feed streams prior to initiation of the codimerization reaction between propylene and n-butylenes.

Accordingly, it is the primary object of the present invention to obviate these and other prior art difficulties. In particular, it is an object to provide a new and improved purification process for the separation of isobutylene from hydrocarbon feeds containing mixtures of butylenes. More particularly, it is an object to provide a process combination wherein a mild preliminary reaction or purification step is employed to separate and remove isobutylene from butylene feed streams, this step being followed by codimerization of propylene and the n-butylenes rich fraction at more stringent conditions.

These and other objects are achieved in accordance with the present invention which contemplates passing a mixed hydrocarbon feed containing isobutylene and n-butylenes into contact, in a suitable chamber or reactor with a supported nickel oxide catalyst and reacting same at mild reaction conditions sufficient to polymerize the isobutylene, but insufficient to produce significant conversion or reaction of a substantial amount of the n-butylenes. The reaction product mixture is then withdrawn and charged to a distillation column, for distilling and separating the n-butylenes rich fraction. In a preferred combination, the high purity n-butylene stream is contacted with a supported nickel oxide catalyst, in the presence of propoylene, and reacted at more stringent reaction conditions to codimerize the propylene and n-butylene to form codimerization products consisting largely of straight chain and single branched $C_6$, $C_7$ and $C_8$ olefins, particularly heptenes.

Suitably, in the purification step isobutylene is separated from the hydrocarbon feed mixture by contact thereof with a supported nickel oxide catalyst at suitable space velocities and temperatures to produce the isobutylene conversion reaction, without significant n-butylenes reaction. Generally, at about 100° F. a space velocity of about 7.5 volumes of feed per hour per volume of catalyst (v./hr./v.) provides adequate isobutylene conversion without significant n-butylenes reaction. For each 40° F. increase in temperature, the space velocity should be doubled. Thus, e.g., at about 140° F. a space velocity of about 15 v./hr./v. would be required. At about 180° F., a space velocity of about 30 v./hr./v. would be required. Adequate temperatures are those ranging from about ambient to about 250° F., or preferably temperatures ranging from about 100° F. to about 200° F. These relatively mild reaction conditions favor dimerization of the isobutylene as compared to more stringent reaction conditions which favor the formation of large amounts of higher molecular weight polymers, i.e., trimers, tetramers, and higher products. At the mild initial reaction conditions, up to about 95 percent, and higher, conversions of the isobutylene can be obtained with relatively low conversion of the n-butylenes. For example, n-butylene conversion can be readily maintained below one percent conversion at isobutylene conversion below seventy percent; and well below one percent at from about forty to about sixty percent isobutylene conversion. It is also feasible to operate at n-butylene conversions ranging no higher than about three percent at isobutylene conversion ranging to as high as about ninety-five percent. In virtually all operations, it is desirable to operate at no higher than from about 1 to about 5 percent conversion of the n-butylenes, based on the weight of total n-butylenes. Because of the low conversion levels which are attainable for n-butylenes at the mild reaction conditions, there is considerable advantage in removing isobutylene from mixed hydrocarbon feeds prior to initiation of codimerization at heptene synthesis conditions.

In a preferred mode of operation, even lower n-butylenes conversion levels are attainable by staging the preliminary reaction, while operating the different stages at mild conditions. For example, very low n-butylenes conversion levels are obtained by operating the several stages at very low isobutylene conversion levels while removing the polymerized materials between the stages. Two and three stages operated by recycle of the unpolymerized fractions is found very satisfactory.

It has also been found that the selectivity to isobutylene dimerization in the purification step can be enhanced by using a nickel oxide catalyst formed under substantially acidic conditions, as contrasted with one formed under basic conditions. By forming the catalyst under acidic conditions, high proportions of the polymerized isobutylene can be recovered as the dimer rather than as higher polymerized products—viz, $C_{12}$ and higher. Best results are obtained when the catalyst is formed at a pH ranging from about 3.5 to about 6.9, and preferably from a pH of about 5 to about 6.9.

Codimerization at heptane synthesis conditions can subsequently be effected by contacting together, reacting or polymerizing propylene and the n-butylenes rich feed in liquid phase in the presence of supported nickel oxide catalysts at conditions suitable to form heptene-rich reaction product mixtures, predominantly lightly branched $C_6$, $C_7$ and $C_8$ olefins. Suitably, the reaction is conducted at supra atmospheric pressures and at temperatures ranging from about 140° F. to about 300° F., and preferably from about 175° F. to about 250° F. Sufficient pressure is provided to maintain the reaction system in liquid phase, at the selected temperature of reaction. Preferably, the pressure employed ranges from about 150 pounds per square inch to about 1000 pounds per square inch, and more preferably from about 200 pounds per square inch to about 500 pounds per square inch.

In the codimerization reaction, the molar ratio of $C_4:C_3$ olefins in the feed is an important operating variable and greatly influences the selectivity of the reaction system to produce the heptenes, especially lightly branched $C_6$, $C_7$ and $C_8$ olefins generally. Under the normal conditions of operation the molar ratio of $C_4:C_3$ olefins ranges from about 1:1 to about 5:1 and greater, and preferably from about 2:1 to about 3.5:1. The optimum cannot be precisely defined inasmuch as it is influenced, to some extent, by other operating conditions.

The preferred catalyst in either the purification step or the codimerization reaction is nickel oxide supported on silica-alumina or other suitable carrier. The nickel oxide can exist as nickel oxide, nickel dioxide, nickel sesquioxide, nickel peroxide, or mixtures of these and other oxides. In most instances nickel oxide is predominant in such mixtures. The silica gel can be used alone or with a catalyst promoter, and can be prepared by any of several known methods. Suitably, the carrier is impregnated with from about 0.1 percent to about 35 percent, and preferably from about 15 percent to about 30 percent, of the nickel oxide, or mixture of oxides, based on the total weight of the resultant catalyst. An amorphous silica alumina gel containing from 10 percent to about 45 percent, and preferably from about 15 percent to about 25 percent alumina, based on the total weight of the reactants, is employed in the reaction mixtures.

The invention will be better understood by reference to the following illustrative examples and demonstrations which bring out the more salient features of the invention.

In the examples below, batch data are shown for the catalyst preparations. In the first example catalysts are prepared and finished under both basic and acidic conditions, and in the second example the catalysts are finished under acidic conditions. It is shown in both Examples 1 and 2 that at about 100 to 105° F., using a feed consisting of 75 percent n-butylenes and 25 percent isobutylene, very high conversions of isobutylene can be obtained with very low conversion or degradation of the n-butylenes. In Example 1, it is additionally shown that the acidic catalyst has very high selectivity in favoring dimer formation vis-a-vis the formation of higher polymers as contrasted with basic catalysts, particularly at the more moderate isobutylene conversion levels. The tabulated data thus compares runs made with both acidic and basic catalysts at different isobutylene conversion levels. The ratio of the dimer ($C_8=$) formed is compared with the amount of trimer, and higher ($C_{12}=+$).

EXAMPLE 1

Supported nickel oxide catalysts are prepared as follows:

Sufficient nickelous nitrate six hydrate $$[Ni(NO_3)_2 \cdot 6H_2O]$$

to obtain an 18 percent nickel catalyst, is dissolved in water and added to a precalcined cracking catalyst. The solution is stirred for ½ hour. For each mole of hydrated nickel nitrate added, 1.58 moles of ammonium carbonate in water is slowly added and the mixture stirred for one hour. The nickel carbonate is precipitated on the support in an acid media to form the acid catalysts. To form basic catalyst, the acid catalysts, after precipitation, are stirred for one hour in basic media.

These catalysts, upon reaction with the feed at 30 v./hr./v., based on total feed, provide the following results:

BUTENE REACTION OVER NICKEL OXIDE CATALYSTS

| Percent isobutylene conversion | Ratio $C_8=/C_{12}=+$ | |
| --- | --- | --- |
| | Basic catalyst | Acidic catalyst |
| 40 | 2.5 | 4.5 |
| 50 | 2.4 | 4.4 |
| 60 | 2.2 | 3.8 |
| 70 | 2.2 | 3.4 |

Over 90 weight percent of the diisobutylene can be converted to dimers, trimers and higher. The ratio of dimer to trimers and higher ranges quite high when using the acidic catalysts. In fact, even at 90 percent isobutylene conversion, the ratio of dimers to trimers and higher can range about 1.9 to 1.

Even at very high conversion levels, only about 2 to 3 percent of the n-butylenes are converted.

EXAMPLE 2

A nickel oxide catalyst is prepared in the same manner as in Example 1 except that 1.00 mole of ammonium carbonate in water is added to the nickel nitrate solution to which a small amount of nitric acid has been added to control the final pH between 5.0 and 6.5. The percent nickel in the catalyst ranges from between 15 to 25 percent of the total weight of the catalyst.

Upon reaction with the feed, as in Example 1, these catalysts provide the following results:

Over 90 weight percent of the diisobutylene is converted to dimers, trimers and higher. The ratio of dimers to trimers and higher is about 2.8 to 1.

Only about 2 to 3 percent of the n-butylenes are converted at this high isobutylene conversion level.

From the above data, it is seen that the catalyst prepared by precipitation from the acid media provides even lower n-butylene conversions than obtained in Example 1 wherein the catalyst was precipitated from a basic media. The acid prepared catalyst also gives a larger amount of dimer as contrasted with higher polymeric products than obtained when preparing the nickel oxide catalyst by use of a basic solution. The dimer is more valuable as a alkylation feed than the polymeric products.

EXAMPLE 3

A nickel oxide catalyst, supported on a silica alumina gel base, is first charged into the autoclave and then a butene-1 rich fraction produced in Example 2 is added, with propylene, and the reactor was then raised in temperature.

Sufficient propylene and n-butene is added to provide a reaction mixture having a 1.8 $C_4:C_3$ molar feed ratio. Reaction is conducted for 60 minutes at a temperature of 176° F. The reaction product mixture is discharged from the reactor at the termination of the run and analyzed.

Analysis of the reaction product mixture shows the following:

OLEFIN PRODUCT DISTRIBUTION, WEIGHT
PERCENT

| | |
|---|---|
| $C_6$ | 20 |
| $C_7$ | 40 |
| $C_8$ | 20 |
| Total $C_6$ through $C_8$ | 80 |
| Total $C_9$ through $C_{12}$ | 20 |

From the foregoing data tabulation it can be seen that relatively high heptene and $C_6$ through $C_8$ yields are obtained.

It is also readily apparent that considerable advantage can be obtained by the combination which comprises adding an initial reactor, or reactors, containing a nickel oxide catalyst in series just before the reactor employed for producing heptenes by codimerization. The initial reactor, or reactors, is operated at relatively mild conditions or conditions sufficient to dimerize the isobutylene to primarily diisobutylene without causing the n-butylenes to react. The diisobutylene, and higher, polymers are easily removed by distillation to provide an n-butylenes rich feed. The process provides a combination wherein isobutylene can be conveniently removed from mixed feed and the residual stream containing the n-butylenes can be combined with propylene and fed to a secondary reactor under conditions which produce an optimum yield of heptenes.

It is apparent that various modifications and changes can be made without departing the spirit and scope of the invention.

Having described the invention, what is claimed is:

1. In a process for the purification of butylene feeds containing isobutylene and n-butylenes, the improvement comprising contacting the feed with a supported nickel oxide catalyst at suitable space velocities and above ambient temperatures sufficient to polymerize the isobutylene, but insufficient for substantial conversion of the n-butylenes, and then separating an n-butylenes rich fraction.

2. The process of claim 1 wherein the isobutylene is polymerized from the butylene feed at temperatures ranging from about ambient to about 250° F.

3. The process of claim 2 wherein the polymerization is conducted at temperatures ranging from about 100° F. to about 200° F.

4. The process of claim 2 wherein the conversion of the n-butylenes ranges no higher than about 5 percent, based on the weight of the total n-butylenes.

5. The process of claim 1 wherein the formation of the nickel oxide catalyst is finished in an acid media.

6. The process of claim 5 wherein the acid media has a pH ranging from about 3.5 to about 6.9.

7. The process of claim 6 where the pH ranges from about 5 to about 6.9.

8. The process of claim 1 wherein the n-butylenes rich fraction is contacted with propylene, in amount sufficient to provide a butylene:propylene molar feed ratio ranging from about 1:1 to about 5:1, and higher, in the presence of a supported nickel oxide catalyst at temperatures ranging from about 140° F. to about 300° F. and at sufficient pressure to provide a liquid phase reaction, to cause copolymerization of propylene and n-butylenes to form high yields of predominantly straight chained and singly branched $C_6$, $C_7$ and $C_8$ olefins.

9. The process of claim 8 wherein the n-butylene:propylene molar feed ratio ranges from about 2:1 to about 3.5:1.

10. The process of claim 8 wherein the catalyst employed is nickel oxide deposited on a silica-alumina gel support.

11. The process of claim 8 wherein the pressures range from about 150 to about 1000 pounds per square inch.

References Cited

UNITED STATES PATENTS

| | | | |
|---|---|---|---|
| 3,255,273 | 6/1966 | Catterall | 260—683.15 |
| 2,606,940 | 8/1952 | Bailey et al. | 260—683.15 |
| 3,045,054 | 7/1962 | Holm et al. | 260—683.15 |
| 2,381,198 | 8/1945 | Bailey et al. | 260—683.15 |

FOREIGN PATENTS 1,493,983  9/1966  France.

DELBERT E. GANTZ, Primary Examiner

J. M. NELSON, Assistant Examiner

U.S. Cl. X.R.

260—677